United States Patent
Fung et al.

(10) Patent No.: US 6,301,011 B1
(45) Date of Patent: *Oct. 9, 2001

(54) DYNAMIC PLUG AND PLAY INTERFACE FOR OUTPUT DEVICE

(75) Inventors: Joseph Z. Fung, Artesia; Vikram R. Mahuvakar, Alhambra; Shee-Yen Tan, Walnut; Ton Huu Truong, Westminster, all of CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,407

(22) Filed: Nov. 7, 1997

(51) Int. Cl.[7] ....................................... G06F 15/00
(52) U.S. Cl. ........................... 358/1.15; 358/1.14
(58) Field of Search ..................... 358/1.14, 1.9, 358/1.12, 1.1, 1.15

(56) References Cited

U.S. PATENT DOCUMENTS

| | | | |
|---|---|---|---|
| 5,604,843 | * 2/1997 | Shaw et al. | 395/101 |
| 6,043,898 | * 3/2000 | Jacobs | 358/1.15 |
| 6,151,590 | * 11/2000 | Cordery et al. | 705/60 |
| 6,240,456 | * 5/2001 | Teng et al. | 709/230 |

* cited by examiner

Primary Examiner—Joseph Mancuso
Assistant Examiner—Douglas Tran
(74) Attorney, Agent, or Firm—Oliff & Berridge, PLC

(57) ABSTRACT

A plug and play interface for output device used in a distributed computer network includes a front end module which submits print jobs to a document processor module. The document processor module processes the print jobs and forwards the print jobs to a back end module, which directs the print jobs to the appropriate output devices. The plug and play interface allows for the addition of various output devices connected by various protocols by simply bringing into to the back end a shared library corresponding to the new output device. Thus, various output devices may be used without requiring any revision of or stopping the system.

16 Claims, 10 Drawing Sheets

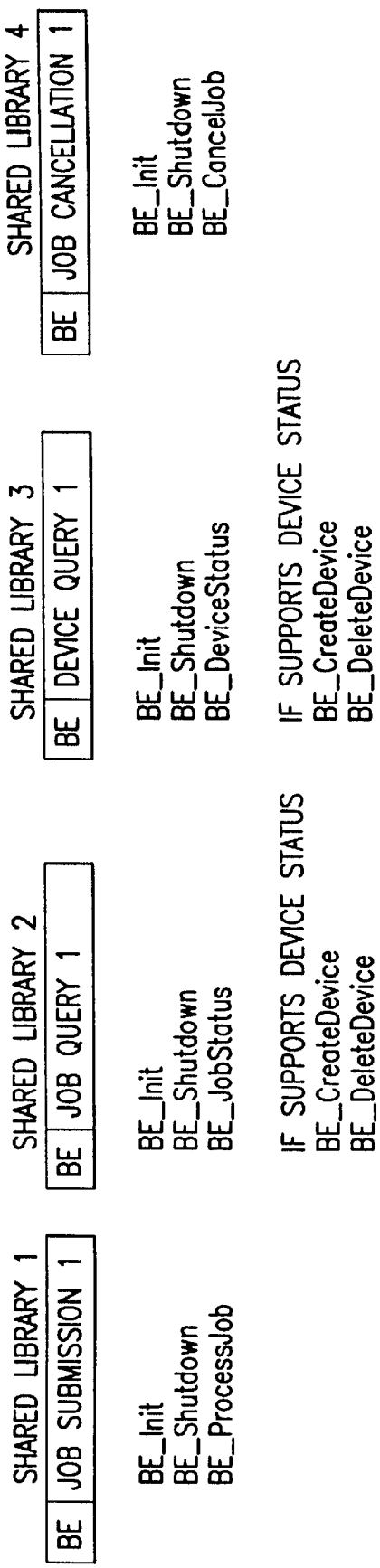

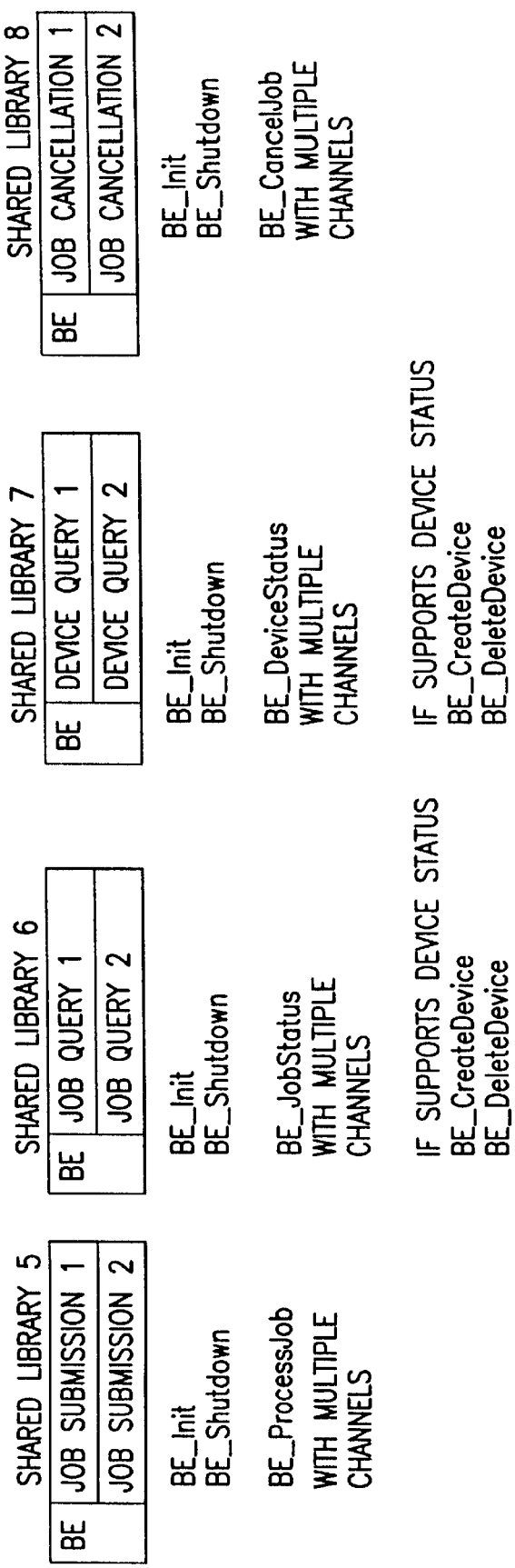

| SHARED LIBRARY 9 | |
|---|---|
| BE | JOB SUBMISSION 1 |
| | JOB SUBMISSION 2 |
| | JOB QUERY 1 |

BE_Init
BE_Shutdown

BE_ProcessJob
WITH MULTIPLE
CHANNELS

BE_JobStatus

IF SUPPORTS DEVICE STATUS
BE_CreateDevice
BE_DeleteDevice

FIG. 4I

| SHARED LIBRARY 10 | |
|---|---|
| BE | JOB SUBMISSION 1 |
| | JOB QUERY 1 |
| | JOB QUERY 2 |

BE_Init
BE_Shutdown

BE_JobStatus
WITH MULTIPLE
CHANNELS

BE_ProcessJob

IF SUPPORTS DEVICE STATUS
BE_CreateDevice
BE_DeleteDevice

FIG. 4J

| SHARED LIBRARY 11 | |
|---|---|
| BE | DEVICE QUERY 1 |
| | DEVICE QUERY 2 |
| | JOB QUERY 1 |

BE_Init
BE_Shutdown

BE_DeviceStatus
WITH MULTIPLE
CHANNELS

BE_JobStatus

IF SUPPORTS DEVICE STATUS
BE_CreateDevice
BE_DeleteDevice

FIG. 4K

| SHARED LIBRARY 12 | |
|---|---|
| BE | JOB SUBMISSION 1 |
| | JOB CANCELLATION 1 |
| | JOB CANCELLATION 2 |

BE_Init
BE_Shutdown

BE_CancelJob
WITH MULTIPLE
CHANNELS

BE_ProcessJob

IF SUPPORTS DEVICE STATUS
BE_CreateDevice
BE_DeleteDevice

FIG. 4L

| SHARED LIBRARY 13 | |
|---|---|
| BE | JOB SUBMISSION 1 |
| | JOB SUBMISSION 2 |
| | JOB QUERY 1 |
| | JOB QUERY 2 |
| | DEVICE QUERY 1 |
| | DEVICE QUERY 2 |
| | JOB CANCEL 1 |

BE_Init
BE_Shutdown

BE_ProcessJob
WITH MULTIPLE CHANNELS

BE_JobStatus
WITH MULTIPLE CHANNELS

BE_DeviceStatus
WITH MULTIPLE CHANNELS

BE_CancelJob

IF SUPPORTS DEVICE STATUS
BE_CreateDevice
BE_DeleteDevice

FIG.4M

| SHARED LIBRARY 14 | |
|---|---|
| BE | JOB SUBMISSION 1 |
| | JOB QUERY 1 |
| | JOB QUERY 2 |
| | DEVICE QUERY 1 |
| | JOB CANCEL 1 |

BE_Init
BE_Shutdown

BE_ProcessJob

BE_JobStatus
WITH MULTIPLE CHANNELS

BE_DeviceStatus

BE_CancelJob

IF SUPPORTS DEVICE STATUS
BE_CreateDevice
BE_DeleteDevice

FIG.4N

SHARED LIBRARY 15

| BE | JOB SUBMISSION 1 |
|----|------------------|
|    | JOB SUBMISSION 2 |
|    | JOB QUERY 1      |
|    | JOB QUERY 2      |
|    | DEVICE QUERY 1   |
|    | DEVICE QUERY 2   |
|    | JOB CANCEL 1     |
|    | JOB CANCEL 2     |

BE_Init
BE_Shutdown

BE_ProcessJob
WITH MULTIPLE CHANNELS

BE_JobStatus
WITH MULTIPLE CHANNELS

BE_DeviceStatus
WITH MULTIPLE CHANNELS

BE_CancelJob
WITH MULTIPLE CHANNELS

IF SUPPORTS DEVICE STATUS
BE_CreateDevice
BE_DeleteDevice

FIG. 4 O

DYNAMIC PLUG AND PLAY INTERFACE FOR OUTPUT DEVICE

BACKGROUND OF THE INVENTION

1. Field of the Invention

The invention relates to a plug and play interface for use in computers and computer networks. More specifically, the invention is directed to a generic interface for use with a number of different output servers/devices.

2. Description of the Related Art

As shown in FIG. 1, the basic conventional printing system 10 uses a client/server architecture that includes a client 20, a server 40 and an output device 50. The client 20 conveys print and management requests to the server 40 and receives responses from the server 40 that arise from the submitted requests.

The server 40 receives these requests from the client 20, performs the required actions for each request, and returns responses to the client 20. One such request from a client is a print request, i.e., a request to print one or more copies of one or more documents, with the printed pages output using one or more features. The features can include simplex or duplex printing, stapling or binding, etc. Thus, a print request represents a collection of one or more documents to be printed as well as instructions for printing. The server 40 organizes the documents and instructions indicated in the print request submitted by the client into a print job. The server then sends the print job and any associated job control commands to the output device 50.

The output device 50 is a physical device or hardware that is capable of rendering images or documents and producing hard copy output of the print jobs received from the server 40. The output device 50 can then return responses to the server 40 regarding its current state or the status of the received print jobs. The output device 50 is commonly a printer.

These conventional systems, however, are designed assuming only one type of output device will be used. Thus, if a different output device is to be used, the entire document processing system must be revised. Such revisions require a great investment of time and money to accomplish.

Furthermore, the conventional systems do not allow a new output device to be added without extensive revision of the system and thus, interruption of the system operation.

SUMMARY OF THE INVENTION

This invention provides simple, generic interfaces with plug-and-play capabilities so that changes in the output device may be accomplished without drastically changing the document processing system.

This invention further provides simple, generic interfaces with plug-and-play capability to facilitate bringing into a running system new output devices connected by various networking protocols such as tcp/ip, serial, parallel, SNMP, DPA, etc., without interruption of the system operation.

The server system and method of this invention includes a print spooler server and a print supervisor server. The supervisor has a front end module, a back end module and a document processor. The spooler receives print requests from a client. The spooler generates print jobs from the print requests and sends the print jobs to the supervisor. The front end module of the supervisor receives the print jobs from the spooler and submits them to the document processor. The document processor processes the print jobs and forwards the print jobs to the back end module. The back end module directs the print jobs to the appropriate output devices.

The method and apparatus of this invention allow various types of output devices to be interchangeably used by simple alterations of the resident shared libraries of the back end module, so that the resident shared libraries reflect the required functions and channels for the particular types of output devices. In this way, a new output device or a new type of output device may be added to the system without having to extensively revise the entire system and without having to interrupt the operation of the system.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIGS. 4A–4O are diagrams showing examples of possible combinations of functions and channels for the back end resident shared libraries

DESCRIPTION OF THE PREFERRED EMBODIMENTS

Figure 1:
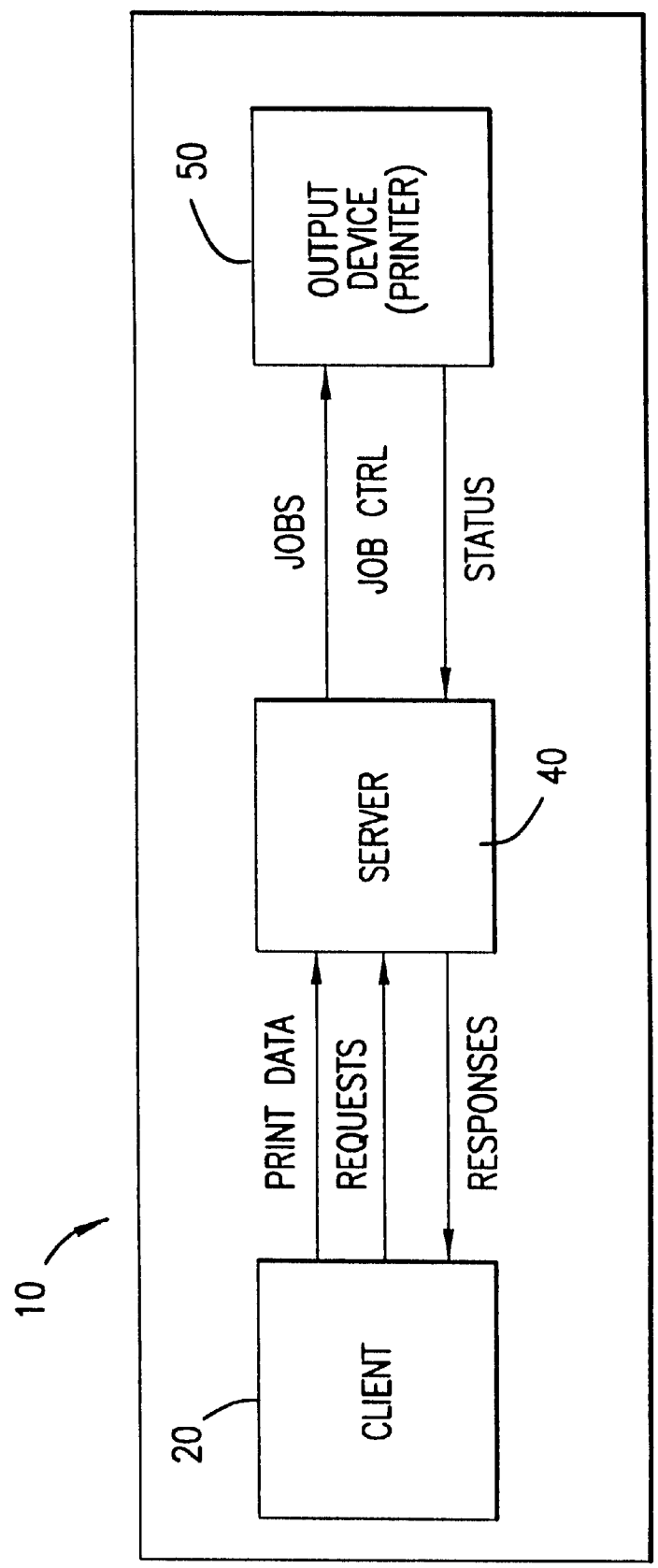
FIG. 1 is a block diagram showing a conventional printing system.
Figure 2:
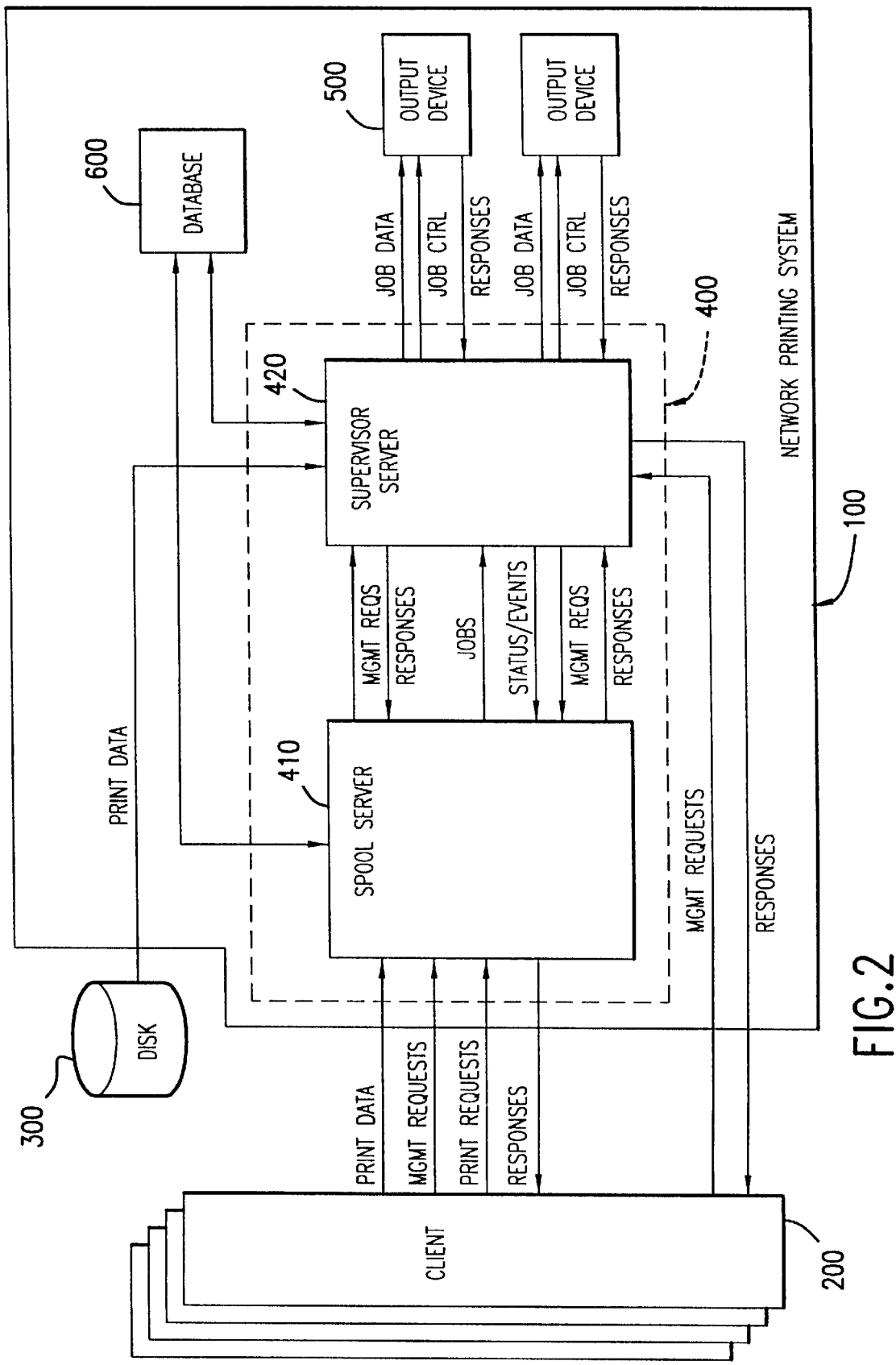
FIG. 2 is a block diagram of a simplified printing system of the invention.

As shown in FIG. 2, the printing system of this invention includes a network printing system 100 comprising a server system 400. The server system 400 of the network printing system 100 includes a spooler server 410 and a supervisor server 420. The spooler 410 receives print requests from one or more clients 200, either directly or via any other source of print requests, such as a storage disk 300. The spooler 410 converts the print requests into print jobs.

The supervisor 420 delivers data to the various output devices 500. The supervisor 420 receives the print jobs from the spooler 410, interprets the print jobs for print instructions and parameters, passes the print data, instructions and parameters to the appropriate output device 500, and handles any responses made by the output device 500. Multiple supervisors 420 can be supported by a single spooler 410. The supervisor 420 can also receive client management requests that apply to the supervisor 420 or to the output devices 500.

Figure 3:
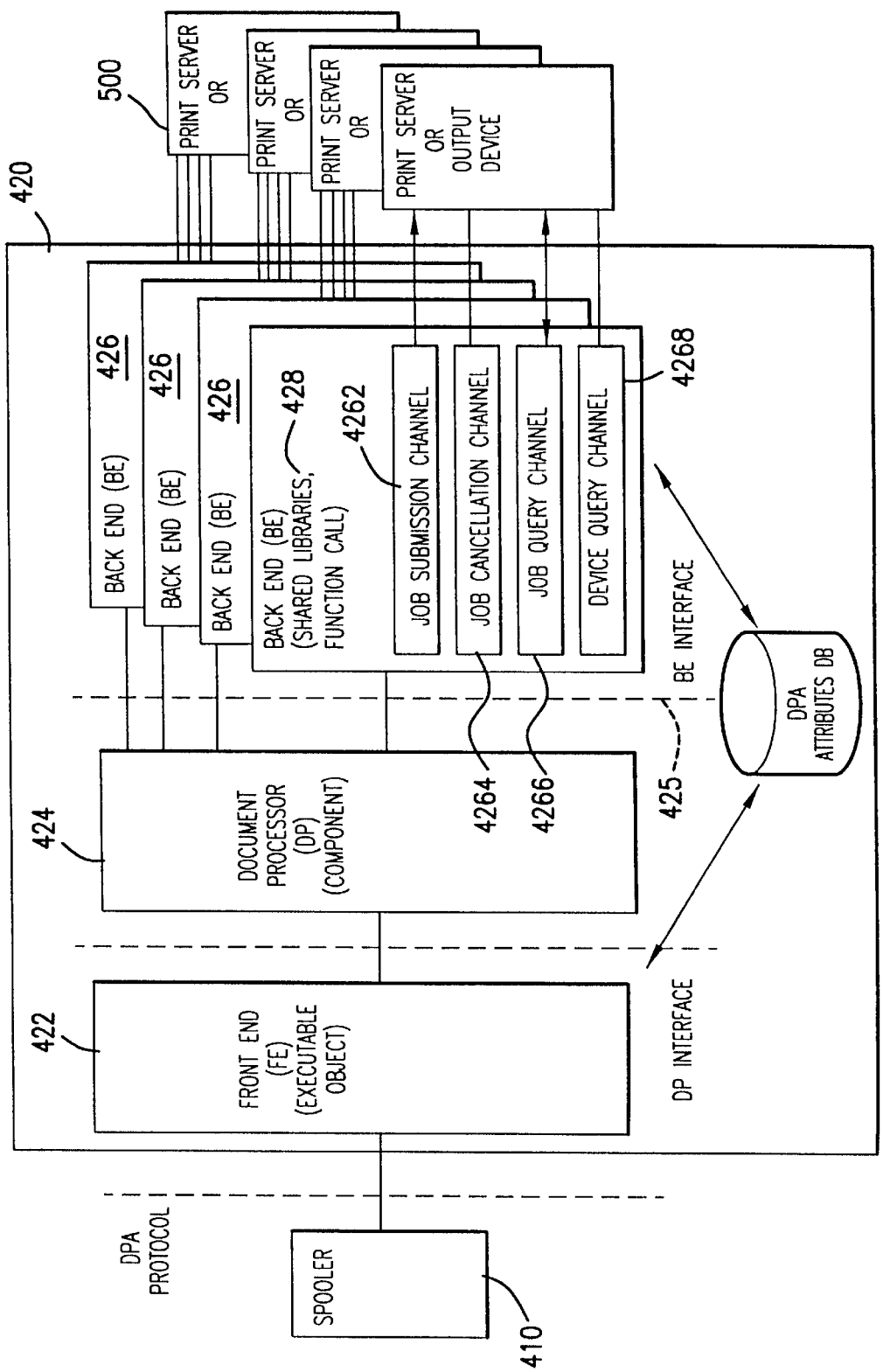
FIG. 3 is a block diagram showing the interaction of the front end module, the back end module and the document processor.

As shown in FIG. 3, the supervisor server 420 includes three major components, a supervisory front end (FE) module 422, a document processor (DP) 424, and document processor back end (BE) module 426.

The supervisory front end module 422 manages all print jobs. The document processor 424 supports all of the physical output devices 500 connected to the server system 400, accepts the print jobs from the front end module 422, and directs the accepted print jobs to a specified job submission channel 4262. The document processor 424 performs periodic job and output device 500 status queries and uses the query results to determine the appropriate time to request the next print job and to balance the load on each output device 500. The document processor back end module 426 communicates with different job submission channels 4262, job cancellation channels 4267, job status query channels 4266 and device status query channels 4268.

The document processor 424 then calls the job submission channel 4262 of the appropriate back end module 426 and forwards the print job to that back end module 426. The back end module 426 can support multiple job submission channels 4262. Thus, the back end module 426 prepares the print job and submits the job through the specified channel 4262.

Upon receiving a call, the back end module 426 requests the document attributes and document data from the document processor 424. Depending on the submission channel 4262, the back end module 426 may map the print job attributes or document attributes into the submission channel's attribute format. The back end module 426 may also modify the document data to embed information in the document data.

The back end module 426 then determines the destination location and address of the appropriate output device 500 and forwards the print job to that output device. An example printer address format for the invention is "hostName, printerName, Extension". The "hostName" is the machine name to which the output device is connected. The "printerName" is the name of the output device (printer) 500. The "Extension" is used to distinguish different kinds of job attribute conversion formats.

If the back end module 426 is unable to retrieve the job identifier from the print server or output device 500 via the job submission channel 4262, the back end module 426 will generate a unique job identifier for monitoring the job. The back end module 426 allocates the memory for output and assigns this token job identifier to it. The document processor 424 frees these memory resources when it is done with them.

The document processor 424 specifies the job submission channel 4262 used to submit the print job. This attribute is used in the future to check if the job query channel 4266 or the job cancellation channel 4264 is compatible with the job submission channel 4262 used.

The back end module 426 then notifies the document processor 426 which in turn notifies the front end module 422 that the print job is in a printing state. The back end module 426 queries the document processor 424 for any job attribute changes.

Before checking the job status, the back end module 426 checks if the print job identifier that was generated is valid for the querying print job. The back end module 426 performs this function by checking the job submission channel used to ensure that this back end job query channel 4266 perform further job status queries.

As shown in FIG. 3, the back end interface 425 is positioned between the document processor 424 and the back end module 426. Each back end module 426 includes a shared library of function calls and callback functions that are used with one or more corresponding output devices 500. Table 1 shows an example set of back end function calls.

TABLE 1

| Back End Module Function Calls | |
|---|---|
| BE_Initialize | Initializes the back end shared libraries. |
| BE_Shutdown | Shuts down the back end components and frees resources for reuse. |
| BE_ProcessJob | Forwards a job to the back end. |

TABLE 1-continued

| Back End Module Function Calls | |
|---|---|
| BE_JobStatus | Queries job status. |
| BE_DeviceStatus | Queries device status. |
| BE_CreateDevice | Creates and registers an output device in the back end module. |
| BE_DeleteDevice | Deletes and unregisters an output device in the back end module. |
| BE_CancelJob | Stops processing of the job and deletes the job object. |

Table 2 shows an example set of callback functions that are invocable by the back end shared library that is resident on each back end module 426. The document processor 424 implements all of the callback functions.

TABLE 2

| Back End Module Callback Functions | |
|---|---|
| BECB_ReportEvent | Informs document processor of an event. |
| BECB_GetDocumentAttrs | Retrieves attributes of a document from the document processor. |
| BECB_GetDocumentData | Retrieves document data from the document processor. |

Each back end module shared library 428 may have many combinations of function calls, some of which are illustrated by FIGS. 4A–4O, necessary for a particular output device 500 or type of output device 500. Every back end shared library 428 includes the function calls "BE_Initialize" and "BE_Shutdown." An example of the function calls "BE_Initialize" and "BE_Shutdown" is set forth in Appendix A.

When a new output device 500 is to be brought into the system, the document processor module will load the corresponding shared library 428. This procedure does not interrupt any operation of system 400.

After loading the shared library 428, the document processor checks if the access pointer of the shared library exists in a linked list. If not, the document processor 426 loads the shared library 428 and saves the access pointer of the shared library 428 in the linked list, and calls the function "BE_Initialize" of this shared library 428. If the access pointer does exist, the document processor 424 simply reloads the shared library 428 without recalling the function "BE_Initialize".

The document processor 424 initializes each back end module 426 only once when the corresponding shared library gets loaded into the supervisor server 420. The document processor 424 initializes a back end module 426 by calling the function "BE_Initialize" and passing a set of callback function pointers to the back end module 426 so that the back end module 426 can communicate with the document processor 424. These callback functions allow the back end module 426 to retrieve the document and document data from the document processor 424 and to report any asynchronous events back to the document processor 424. Examples of callback functions are set forth in Appendix B.

Figure 5:
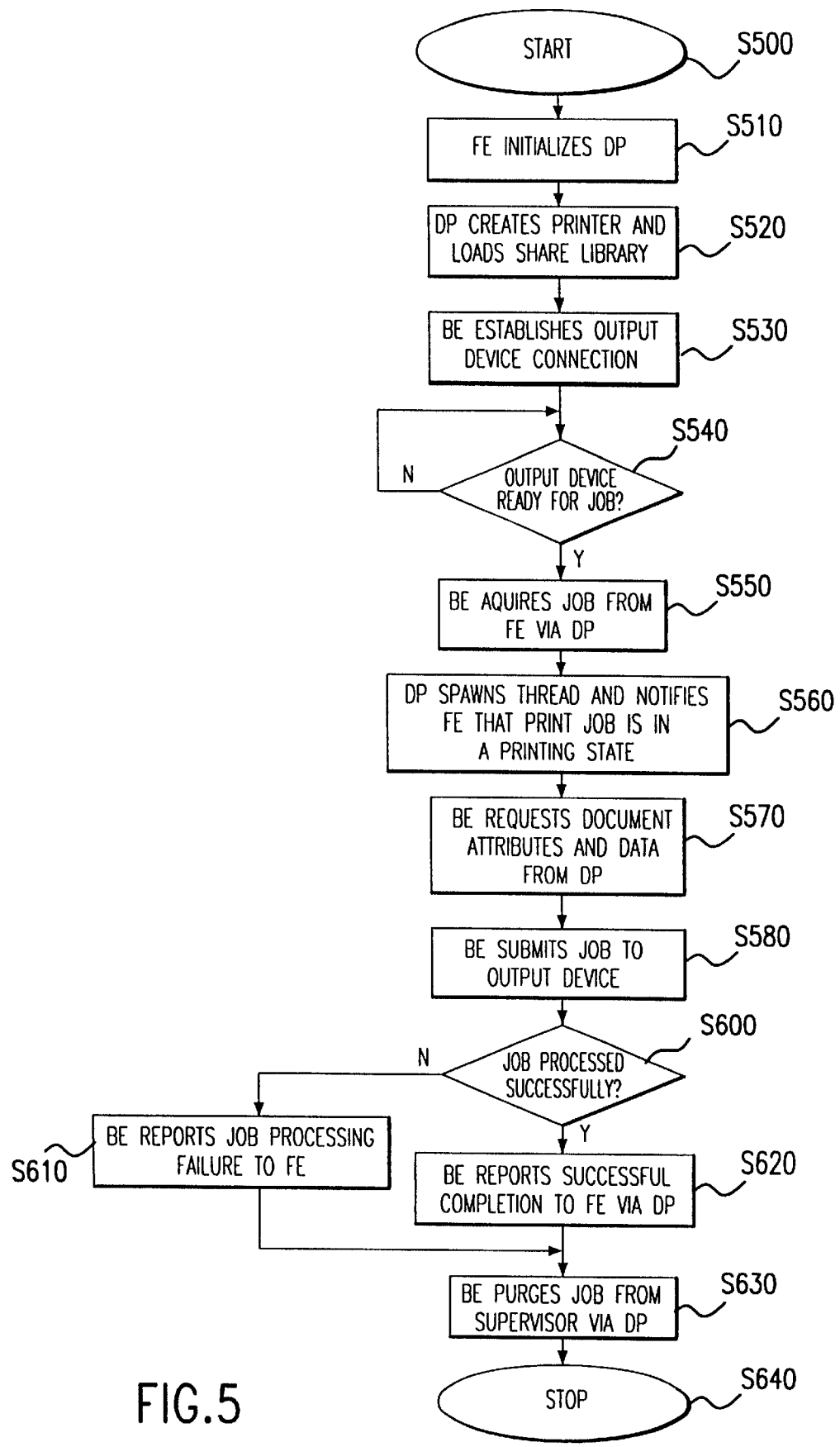
FIG. 5 is a flowchart outlining one preferred embodiment of the operation of the front end module, back end module, and document processor according to the invention.

FIG. 5 is a flowchart outlining one preferred embodiment of the operation of the front end module 422, the document processor 424 and the back end module 426. The control routine begins in step S500 and continues to step S510. In step S510, the document processor 424 receives a call from the front end module 422 to create a printer object. Then in step S520, the document processor 424 registers an output device 500 and loads the shared library 428 for that output device 500. Next, in step S530, the back end module 426 establishes the output device connection, including the job submission channels 4262, the job cancellation channels 4264, the job query channels 4266 and the device query channels 4268.

In step S540, the document processor 424 then determines if the output device 500 is in a correct state to process the print job. If the output device 500 is not ready, control loops back to step S540, and continues in this loop until the print device 500 is ready. Once the print device 500 is ready, control continues to step S550.

In step S550, the front end module 422, via the document processor 424 forwards the print job to the back end module 426 via a job submission channel 4262. The desired job submission channel 4262 is identified in the shared library of the back end module 426. The back end module 426 can support multiple job submission channels 4262. Thus, the back end module 426 prepares the print job and submits it through the specified channel. Appendix C sets for an example function for performing the print job processing.

Then, in step S560, the document processor 424 spawns a thread and notifies the front end module 426 that the print job is in a printing state.

Next, in step S570, upon receiving a request to process a print job, the back end module 426 requests the document attributes and document data from the document processor 424. Depending on the submission channel used, the back end module 426 may convert the print job or document attributes into the submission channel's attribute format. The back end module 426 may also modify the document data to embed information in the document data.

Then, in step S580, the back end module 426 determines the destination output device 500 location and forwards the print job to that address/location. An example printer address format useable with this invention is "hostName, printerName, Extension". The "hostName" is the machine name on which the print server is running. The "printerName" is the name of the requested output device 500. The "Extension" is used to distinguish different kinds of lpr formats.

In step S600, the back end module 426 checks the status of the job. If the status indicates the job has been processed successfully, control continues to step S610, otherwise control jumps to step S620. In step S610, the back end module 426 reports the failure to the front end module 422 and document processor 424. Control then jumps to step S630. In step S620, the back end module 426 reports the successful completion to the front end module 422 and the document processor 424. Control then continues to step S630.

In step S630, the back end module 426 purges the job from the front end module 422 via the document processor 424. Control then continues to step S640, where the operation of the front end module 422, the document processor 424 and the back end module 426 stops.

Figure 6:
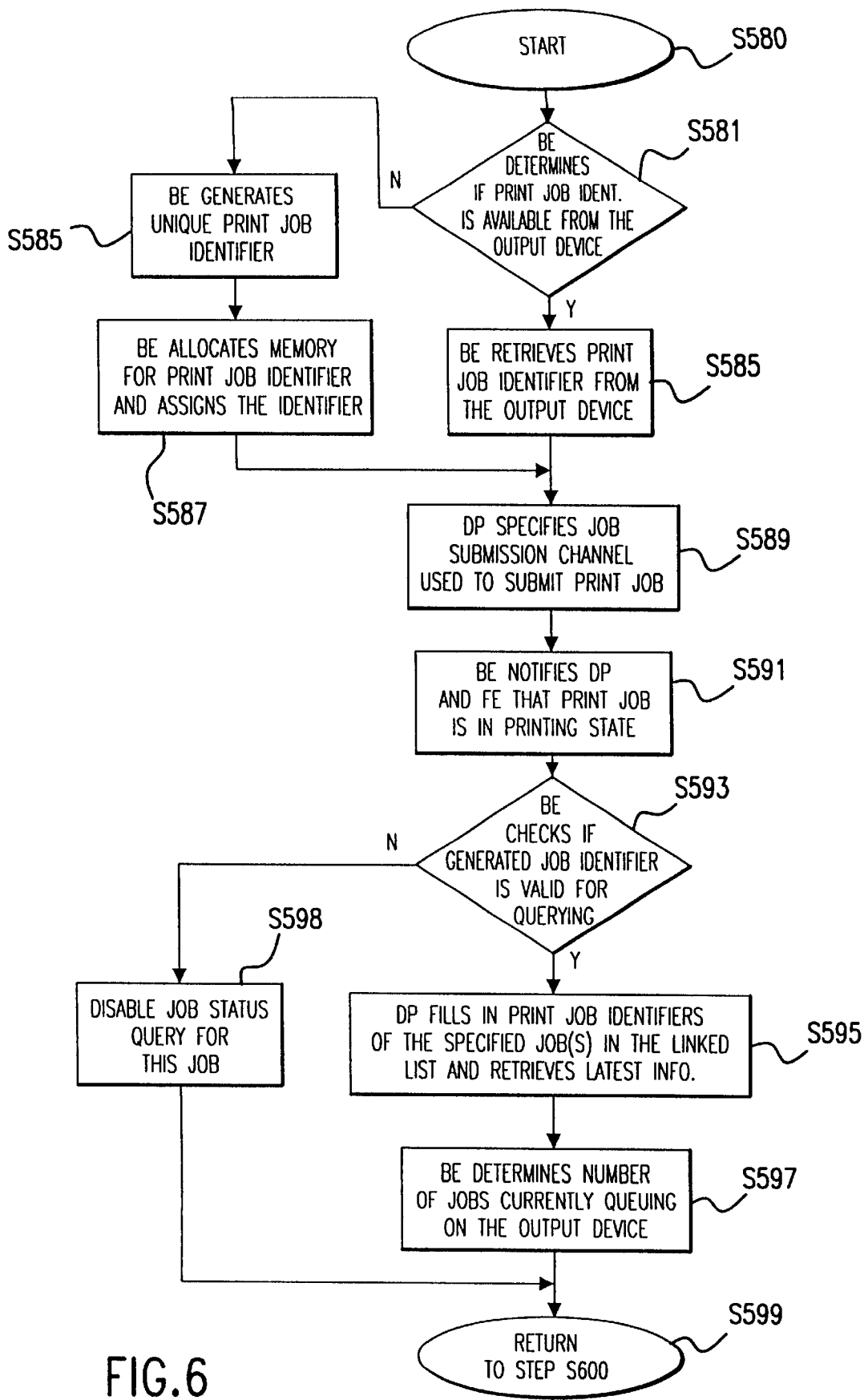
FIG. 6 is a flowchart outlining in greater detail the destination location determining step of FIG. 5.

FIG. 6 outlines in greater detail how the back end module 426 determines the destination device 500 location and forwards the print job in step S580. As shown in FIG. 6, starting from step S580, control continues to step S581. In step S581, the back end module 426 determines if a print job identifier is available from the output device 500. If so, control continues to step S583, otherwise, control jumps to step S585. In step S582, the back end module 426 retrieves the print job identifier from the output device 500. Control then jumps to step S589.

In step S585, if the back end module 426 is unable to retrieve the print job identifier from the output device 500 via the job submission channel 4262, the back end module 426 generates a unique print job identifier for monitoring the print job. Then, in step S587, the back end module 426 allocates the memory for the print job identifier and assigns this unique print job identifier to it. Control then continues to step S589.

In step S589, the document processor 422 specifies the job submission channel 4262 used to submit the print job. Then, in step 591, the back end module 426 notifies the document processor 424, which in turn notifies the front end module 422, that the print job is in a printing state.

Next, in step S593, before checking the print job status in step S600, the back end module 426 checks if the generated job identifier is valid for the querying job. The back end module 426 performs this function by checking the channel used to ensure that this back end module job query channel 4266 could be used to perform further job status queries. If the job identifier is valid, control continues in step S595, otherwise control jumps to step S598.

In step S595, the document processor 424 fills in the print job identifiers of the specified job(s) in the linked list and retrieves the latest print job information. Then, in step S597, the back end module 426 determines the number of jobs that are currently queuing on the output device 500. The document processor 424 saves this value into its own memory space. This number is used to balance the load on the output devices 500. Control then jumps to step S599. In step S598, the job status query for the print job is disabled. Control then continues to step S599. In step S599, control returns to step S600.

With this system and method, users may customize the system to the particular output devices 500 that are to be used by altering the back end module shared libraries 428. FIGS. 4A–4O outline various possible combinations of functions to build value-added shared libraries. The only requirement for the shared libraries 428 is that they each must have the "BE_Initialize" and "BE_Shutdown" call functions. The implementation of the call function "BE_Processjob" is required for job submission, the call function "BE JobStatus" is required for job query and the call functions "BE CreateDevice", "BE_DeleteDevice" and "BE_DeviceStatus" are required for device querying.

While this invention has been presented as a document processing system and method, various modifications and additions may be made without departing from the spirit and scope of the invention. In particular, the various functions described are not meant to be limiting but are rather illustrative of one particular embodiment and may be altered.

What is claimed is:

1. An interface for communication between a processing device and at least one output device, comprising:

a front end module that receives a print job;

a processing module that processes the print job submitted by the front end module to generate a processed print job;

a plurality of shared libraries; and a plurality of back end modules, each back end module including at least one of the plurality of shared libraries and associated with at least one output device, wherein, the processing module outputs the processed print job to one of the plurality of back end modules and that back end module directs the processed print job to one of the at least one output device associated with that back end module, that back end module communicating with that one output device using the at least one shared library included in that back end module as the one output device prints that processed print job.

2. The interface of claim 1, wherein each back end module supports at least one job submission channel.

3. The interface of claim 2, wherein, for each back end module, at least one of the plurality of shared libraries is included in that back end module indicates which of the at least one job submission channel is to be used by that back end module when communicating with the at least one output device associated with that back end module.

4. The interface of claim 2, wherein, for each back end module, that back end module further includes at least one of the plurality of shared libraries that supports at least one of:

at least one job status query channel;

at least one device status query channel; and at least one job cancellation channel.

5. The interface of claim 4, wherein, for each back end module, at least one of the plurality of libraries is included in that back in module indicates which of the at least one job status query channel, the at least one device status query channel and the at least one job cancellation channel is to be used by that back end module when communicating with the at least one output device associated with that back end module.

6. The interface of claim 1, wherein, for each back end module, at least one of the plurality of libraries is included in that back in module indicates at least one function to be used by that back end module when communicating with the at least one output device associated with that back end module.

7. The interface of claim 1, wherein when a new output device is to be added, the at least one of the plurality of back end modules associated with that new output device is modified to include a new shared library associated with that new output device.

8. The interface of claim 7, wherein a new output device is added without interrupting an operation of the front end module, processing module or the plurality of back end modules.

9. The interface of claim 1, wherein, when the processing module begins to process a print job for a particular output device, the back end module associated with that particular output device requests the attributes and data corresponding to that print job.

10. The interface of claim 1, wherein at least one of the at least one output device is a printer, print server, fax, pager, or e-mail system.

11. A method of communicating between a client application and at least one output device using a system comprising a front end module, a processing module, a plurality of shared libraries, and a plurality of back end modules associated with at least one output device, each back end module including at least one of the plurality of shared libraries, comprising:

receiving a print job at the front end module;

processing the print job submitted by the front end module in the processing module to generate a processed print job;

forwarding the processed print job to one of the plurality of back end modules; and directing the processed print job to one of the at least one output device associated with that back end module using that back end module, that back end module communicating with that output device using the at least one shared library included in that back end module as the one output device prints that processed print job.

12. The method of claim 11, wherein the step of directing the processed print job includes determining which of at least one job submission channel is to be used by that back end module when carrying out the print job.

13. The interface of claim 12, wherein directing the processed print job includes determining which of at least one job status query channel, at least one device status query channel and at least one job cancellation channel is to be used by that back end module when carrying out the processed print job.

14. The method of claim 11, wherein, when a new output device is to be added to the system, directing the processed print job includes modifying at least one of the plurality of back end modules associated with that new output device to utilize a new shared library associated with the new output device.

15. The method of claim 13, wherein the communication between a processing device and at least one output device is not interrupted by the addition of a new output device.

16. The method of claim 11, wherein processing and forwarding the processed print job includes requesting the attributes and data corresponding to that print job.

* * * * *